United States Patent

Cheok

[11] Patent Number: 5,987,809
[45] Date of Patent: Nov. 23, 1999

[54] DEVICE FOR TRAPPING INSECTS

[76] Inventor: Kian Yek Cheok, No. 28, Lorong Permata 4/1, Jalan Permata 4, Taman Permata, 70200 Seremban, Negeri Sembilan, Malaysia

[21] Appl. No.: 08/894,983
[22] PCT Filed: Mar. 3, 1995
[86] PCT No.: PCT/GB95/00463
  § 371 Date: Jan. 9, 1998
  § 102(e) Date: Jan. 9, 1998
[87] PCT Pub. No.: WO96/22683
  PCT Pub. Date: Aug. 1, 1996

[30] Foreign Application Priority Data

Jan. 23, 1995 [MY] Malaysia ............................ PI 9500149

[51] Int. Cl.⁶ .............................. A01M 1/20; A01M 1/10
[52] U.S. Cl. ................................................ 43/107; 43/122
[58] Field of Search ............................. 43/113, 107, 121, 43/122; 47/69; 119/248, 253, 246

[56] References Cited

U.S. PATENT DOCUMENTS

| D. 248,744 | 8/1978 | Murray ................................. D11/143 |
| 1,103,656 | 7/1914 | Campbell ................................. 43/122 |
| 1,192,334 | 7/1916 | Martin ................................. 43/122 |
| 1,209,993 | 12/1916 | Oettinger ................................. 43/122 |
| 1,606,568 | 11/1926 | Gross ................................. 43/107 |
| 1,703,022 | 2/1929 | Weinrich ................................. 43/122 |
| 2,046,430 | 7/1936 | Rutherford ................................. 43/122 |
| 2,249,601 | 7/1941 | Chapman ................................. 43/122 |
| 2,478,104 | 8/1949 | Johnson ................................. 43/122 |
| 3,581,429 | 6/1971 | Hickman ................................. 43/107 |
| 4,608,774 | 9/1986 | Sherman ................................. 43/114 |
| 4,738,049 | 4/1988 | Baley ................................. 43/122 |
| 4,793,092 | 12/1988 | Avittan ................................. 43/122 |
| 5,048,224 | 9/1991 | Frisch ................................. 43/114 |
| 5,231,791 | 8/1993 | Falkson ................................. 43/122 |
| 5,231,792 | 8/1993 | Warner ................................. 43/122 |
| 5,253,450 | 10/1993 | Muramatsu ................................. 43/122 |
| 5,339,563 | 8/1994 | Job ................................. 43/122 |
| 5,392,560 | 2/1995 | Donahue et al. ................................. 43/122 |
| 5,406,743 | 4/1995 | McSherry et al. ................................. 43/122 |
| 5,461,822 | 10/1995 | Green et al. ................................. 43/122 |
| 5,557,880 | 9/1996 | Schneidmiller ................................. 43/122 |

FOREIGN PATENT DOCUMENTS

| 1580233 | 11/1980 | United Kingdom . |
| 2230172 | 10/1990 | United Kingdom . |
| 2258130 | 2/1993 | United Kingdom . |

Primary Examiner—Kurt Rowan
Assistant Examiner—Fredrick T. French, III
Attorney, Agent, or Firm—Samuels, Gauthier & Stevens

[57] ABSTRACT

A device traps insects, such as flies, by attracting them to a lure or bait placed on a black/dark colored plate supporting the device. The device is composed of a base frame (13) with dark light blocking walls (21) raised above the plate and a combined hollow pyramid (12) and a cuboidal container (15) with light transmitting walls above the base frame (13). The device is thus designed to be dark at its bottom part and light at its upper part, thus inducing the insects which have entered to fly upwards towards the small opening (14) at the apex (9) of the pyramid (12). Those flies which fly through the opening (14) are then trapped within the container.

11 Claims, 2 Drawing Sheets

DEVICE FOR TRAPPING INSECTS

TECHNICAL FIELD

The invention relates to a device for trapping insects particularly, but not solely, flies.

BACKGROUND OF THE INVENTION

Fly-traps for catching and killing flies are well known. As flies are small elusive insects with well-developed flying capabilities, the task of catching them has always been a difficult one. Simple fly papers rely on adhesive to trap flies by chance encounter with the wings or body of a fly. More sophisticated devices are also known such as the electrically-powered fluorescent tube which makes use of a purplish light and electric current to electrocute flies. This type of device requires the use of electricity and is not usable out doors where there is no electrical supply. Some devices are not particularly effective because the odour of destroyed flies repel other flies.

A general object of the invention is to provide an improved form of device for trapping insects such as flies. Examples of prior art insect traps are described in GB-A-2258130, GB-A-1580233, GB-A-2230172 and U.S. Pat. No. 1,606,568.

DISCLOSURE OF THE INVENTION

According to the present invention there is provided a device for use in trapping insects; said device comprising means for defining a first space or chamber accessible through access means from the surroundings, the first space defining means having a wall with a generally non-light transmitting character directly adjacent the access means, which is open around the entire extent of the wall, means for supporting the device on a separate black or dark supporting surface underlying the first space during use, and means for defining a second space or chamber, the second space being closed from the surroundings except for at least one passage defining means extending between the first ad second spaces, the second space defining means and the passage defining means having a generally light transmitting character, whereby bait placed on the supporting surface in a zone illuminated by light entering the second space defining means and the passage defining means is directly accessible to insects via the access means and serves to lure insects to enter the device and any insects entering the first space via the access means and said wall of the first space are attracted by the light entering the second space and the passage defining means and induced to pass through the passage defining means and thereby become trapped in the second space.

Further preferred features of the invention are defined in the subsidiary claims appended hereto.

In one specific form the invention provides a device composed of a hollow cone with a solid side or a pyramid with solid sides the side or sides being made of transparent or translucent material with an opening at the apex of the cone or pyramid;

a hollow cuboidal container with translucent or transparent sides and an open or partly open bottom which is placed over the cone or pyramid to cover it completely from above, a platform frame with dark walls defining a space in the centre used as a stand for the cone or pyramid and a black or dark-coloured square plate for supporting the platform frame thereabove and for receiving bait to lure insects to enter into the space defined by the platform frame.

BRIEF DESCRIPTION OF THE DRAWINGS

A specific embodiment of the invention will now be described, by way of example only, with reference to the accompanying drawings in which.

BEST MODE OF CARRYING OUT THE INVENTION

Figure 1:
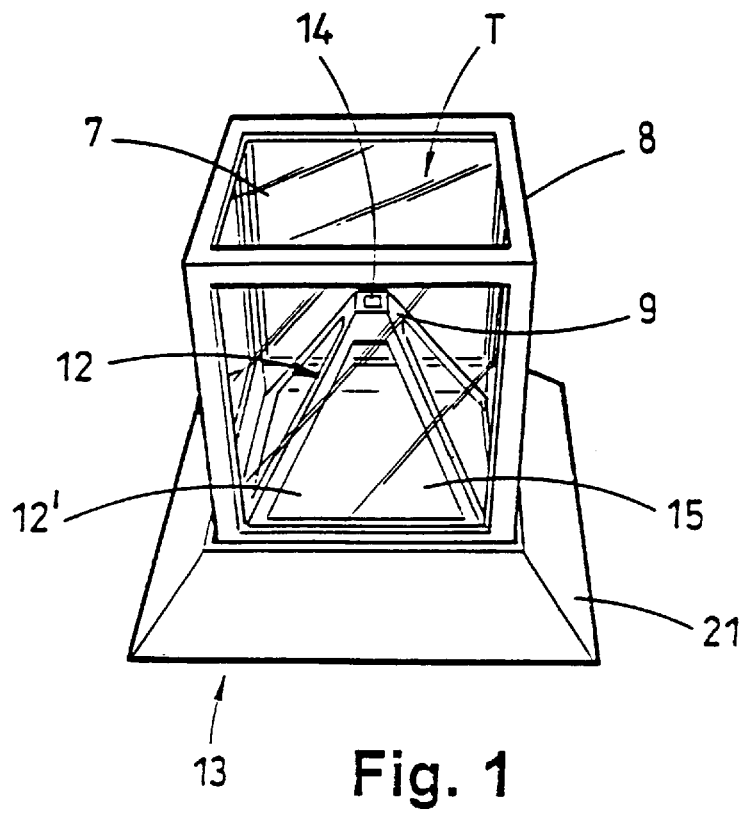
FIG. 1 is a side perspective view of a device constructed in accordance with the invention.
Figure 2:
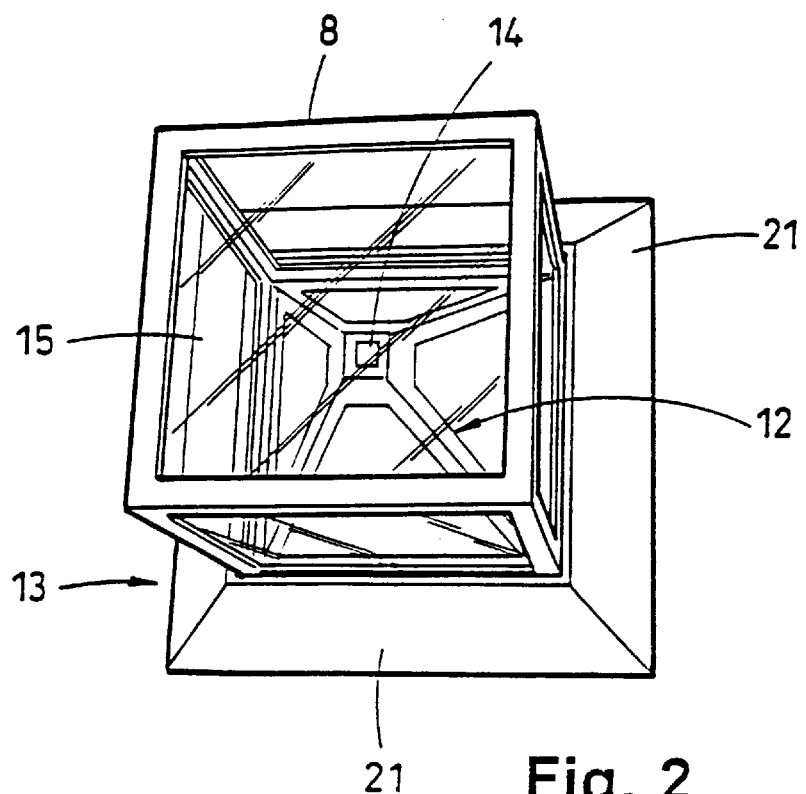
FIG. 2 is a top perspective view of the device shown in FIG. 1.

As shown in the drawings, a device constructed in accordance with the invention is composed of a hollow pyramid 12 with a square base mounted on a generally rectangular open frame 13 acting as a base or platform and a hollow cuboidal container 15 mounted over the upper region of the pyramid 12. The pyramid 12 has a framework with four wall panels 12' sloping to an apex 9. The container 15 similarly has a framework 8 composed of right angled sections with wall panels 7 therebetween. The bottom wall panel is omitted so that the bottom portion of the framework 8 seats snugly on the wall panels 12' and framework of the pyramid 12 to close off the interior of the container 15.

Figure 3:
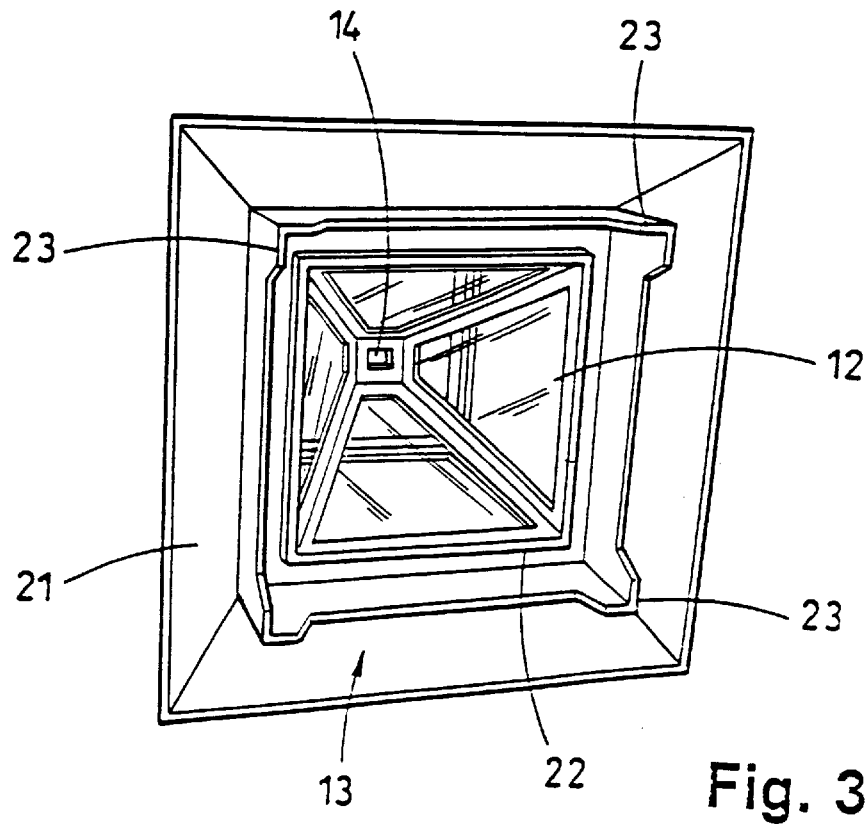
FIG. 3 is an underside perspective view of the device shown in FIGS. 1 and 2 and FIG. 4 is an underside perspective side view of the device.
Figure 4:
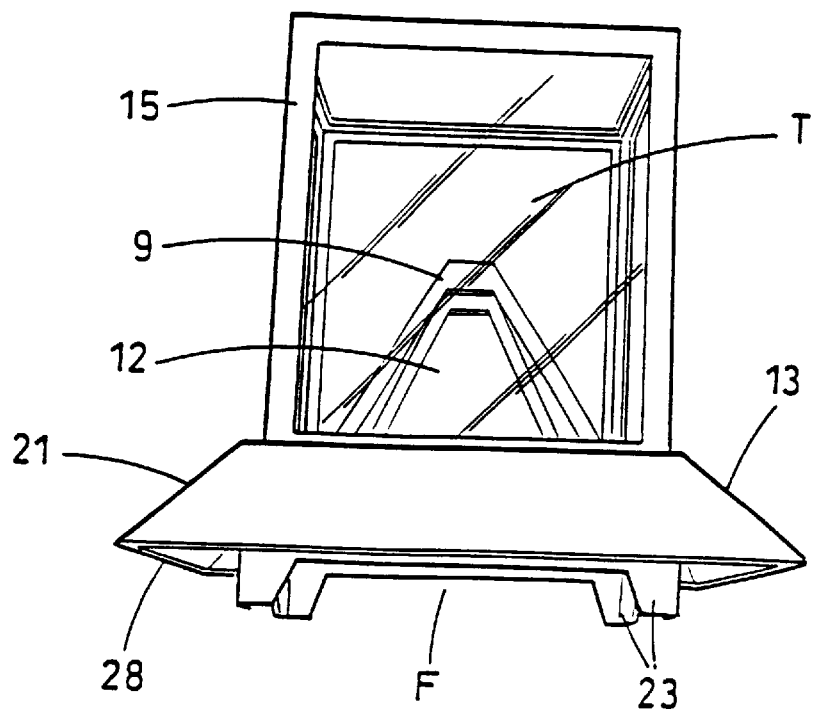

The platform 13 has a frusto-conical wall 21 (FIG. 4) acting as a screen as well as an internal frame 22 (FIG. 3) with depending legs 23 which serve as support means to raise the device above a support surface (not shown). The platform wall 21 is made of non light-transmitting material typically dark coloured or black whereas the wall panels 12' of the pyramid 12 and the wall panels 7 of the container 15 are made of light transmitting material. Conveniently all the components 12, 13, 15 are made from plastics material.

The apex 9 of the pyramid 12 has an aperture 14 therein permitting passage for insects between the inside of the pyramid 12 and the container 15. When the device is placed on the support surface access for insects is provided around the lower edge (28) of the wall 21 of the platform 13 which is raised above the support surface. The support surface is preferably provided by a non-light transmitting plate (not shown in the drawings).

The wall 21 of the platform 13 defines with the support surface a first chamber or space F or attracting insects from the surroundings.

The wall panels 7 of the container 15 and the upper region of the pyramid wall panels 12' define another chamber or space T in which the insects become trapped and are killed. The interior of the pyramid 12 and the aperture 14 provide guidance and access for the insects between the chambers or spaces F, T, thus defined.

In order to use the device, bait is preferably placed at the central region of the support plate on which the legs 23 rest. The bait can be either kitchen waste, stale or smelly food, or any chemical or substance which emits an odour which attracts insects particularly flies. The odour of the bait attracts the insects which enter the device through the access space at the underside of the wall 21 of the platform 13. After consuming some of the bait, or exploring the substance in the camber F, the insects tend to fly upwards towards the apex 19 of the pyramid by instinct—as the upper part of the device is brighter than the inner surface of the chamber F.

The insects which fly upwards inevitably fly through the opening 14 at the apex 9 of the pyramid 12 and are then trapped in the chamber T in the container 15. The one and only way for the insects to escape is to fly back down through the opening 14. However, trapped insects are very unlikely to do this since the opening 14 is small and the lower region is dark. Having detected light from the sides of the container 15, insects will instinctively fly against the sides to try to fly away.

Trapped insects die of starvation, or dehydration particularly if the device is placed outdoors and under the hot sun. Alternatively, the insects may be killed as soon as they are trapped, by submerging the device in water. Another alternative method of killing the trapped insects is to spray insecticide in through the access space at the underside of the platform 13.

It should be understood that the scope of the invention is not limited to the preceding specific disclosure. Various modifications can be made to the device and in particular the shape of the components 12, 13, 15, can take various other forms. For example the pyramid 12 can be a cone with a round base or a pyramid with a triangular base, a trapezoidal base or some other polygonal structure.

Some other characteristic features of the invention are as follows:

The device uses light to attract insects to fly upwards and through a small opening into an enclosed container to be trapped and the insects are unlikely to attempt to pass down through the opening.

The device has a relatively dark bottom interior and a relatively bright top part to lead the insects attracted by the bait into flying upwards and inevitably through the small opening.

The device is always usable so long as there is some light.

An enormous variety of kitchen wastes or stale or smelly foods or chemicals or substances which emit an odour which attract insects can be used as the bait.

The device relies on the principles that insects particularly flies would be led to the bait by scent and would instinctively fly upwards thereafter in the direction of light instead of the direction of the darkened sides of the bottom of the device.

Insects are not deterred from entering the device by any odours from previously destroyed insects because such odours do not detract from the bait. Fresh bait can always be used from time to time.

The device prevents trapped insects from escaping down through the opening at the apex of the pyramid by having the dark bottom.

The device destroys the trapped insects naturally by starving and/or dehydrating them.

The device does not require the use of any poison or chemical to kill the insects.

The device does not require the use of any electricity or any other energy source to operate.

The device can be adapted easily to catch live insects, by installing a removable container (15) onto the pyramid (12).

I claim:

1. A device for use in trapping insects; said device comprising means for defining a first space or chamber accessible through access means from the surroundings, the first space defining means having an outwardly flared skirt with a generally non-light transmitting character directly adjacent the access means, the access means being substantially open around the entire extent of the skirt, individual legs projecting downwardly beyond the skirt for removably supporting the device on a separate component with a black or dark supporting surface underlying the first space during use; and means for defining a second space or chamber, the second space being closed from the surroundings except for at least one passage defining means extending between the first and second spaces, the second space defining means and the passage defining means having a generally light transmitting character, whereby bait placed on the supporting surface in a zone illuminated by light entering the second space defining means and the passage defining means is directly accessible to insects via the access means and serves to lure insects to enter the device and any insects entering the first space via the access means are attracted by the light entering the second space and the passage defining means and induced to pass through the passage defining means and thereby become trapped in the second space.

2. A device according to claim 1, wherein the first space is at least partly defined by an open frame acting as a platform or base and legs raise the frame from the supporting surface and act as support means to provide the access means below the frame and between the legs.

3. A device according to claim 2, wherein the supporting surface is provided by a separate black or dark plate.

4. A device according to claim 2, wherein the legs are formed on another frame disposed inwardly of the platform frame.

5. A device according to claim 4, wherein the platform frame and/or the other frame are rectangular.

6. A device according to claim 2, wherein the skirt of the first space defining means is a frusto-conical skirt of the platform frame which is made of non light transmitting material.

7. A device according to claim 1, where the means defining the second space comprises a cone or pyramid supported by the first space defining means and defining the passage and a container mounted on to the cone or pyramid with said at least one passage being terminated by a hole in the apex of the cone or pyramid.

8. A device according to claim 7, wherein the container is cuboidal in shape.

9. A device according to claim 7, wherein the container is mounted onto an upper region of the cone or pyramid.

10. A device according to claim 7, wherein the cone or pyramid and/or the container has a skirt or skirts which are at least partly light transmitting.

11. In a device for use in trapping insects; said device comprising a structure with means for defining a first chamber, access means for permitting access for insects to the first chamber from the surroundings and means for defining a second chamber, the second chamber being closed from the surroundings except for at least one passage defining means extending between the first and second chambers, the second chamber defining means and the passage defining means having a generally light transmitting character, the improvement comprising the access means providing access to the first chamber, is substantially open around the entire extent of a lower region of the structure and a frusto-conical skirt of generally non-light transmitting character is provided at the lower region of the structure to define and delimit the access means from above, depending legs are disposed inwardly of the structure relative to the frusto-conical skirt and extend below the frusto-conical skirt in order to contact and support the structure during use of the device on a dark or black support surface underlying the structure and beneath the access means, whereby bait placed on the supporting surface in a zone illuminated by light entering the second space defining means and the passage defining means is directly accessible to insects via the access means and serves to lure insects to enter the device and any insects entering the first chamber via the access means are attracted by the light entering the second space and the passage defining means and induced to pass through the passage defining means and thereby become trapped in the second chamber.

* * * * *